Nov. 23, 1965  M. K. BUCHNER  3,219,080
APPARATUS FOR SPLITTING AND PITTING FRUIT
Filed Aug. 14, 1961  7 Sheets-Sheet 1

FIG_1

INVENTOR
MARVIN K. BUCHNER
BY Hans G. Hoffmeister.
ATTORNEY

FIG_2

Nov. 23, 1965  M. K. BUCHNER  3,219,080
APPARATUS FOR SPLITTING AND PITTING FRUIT
Filed Aug. 14, 1961  7 Sheets-Sheet 3

FIG_3

FIG_4

FIG_5

INVENTOR
MARVIN K. BUCHNER
BY Hans G. Hoffmeister
ATTORNEY

Nov. 23, 1965 M. K. BUCHNER 3,219,080
APPARATUS FOR SPLITTING AND PITTING FRUIT
Filed Aug. 14, 1961 7 Sheets-Sheet 6

FIG_8

FIG_9

FIG_10

FIG_11

INVENTOR
MARVIN K. BUCHNER

BY *Hans G. Hoffmeister*
ATTORNEY

Nov. 23, 1965    M. K. BUCHNER    3,219,080
APPARATUS FOR SPLITTING AND PITTING FRUIT
Filed Aug. 14, 1961    7 Sheets-Sheet 7

FIG_12

FIG_13

FIG_14

INVENTOR
MARVIN K. BUCHNER
BY Hans G. Hoffmeister
ATTORNEY

United States Patent Office

3,219,080
Patented Nov. 23, 1965

3,219,080
APPARATUS FOR SPLITTING AND
PITTING FRUIT
Marvin K. Buchner, San Jose, Calif., assignor to FMC Corporation, San Jose, Calif., a corporation of Delaware
Filed Aug. 14, 1961, Ser. No. 131,201
17 Claims. (Cl. 146—28)

The present invention pertains to an apparatus for splitting and pitting fruit and, more particularly, to pitting apparatus of the type wherein the fruit is bisected and the halves are moved laterally away from the pit.

Machines have previously been used for splitting the flesh, or epicarp, of a freestone peach, for example, into halves and for separating the halves from the pit, or endocarp, preparatory to canning. In most machines of this type, the fruit is cut along its suture plane into segments, usually halves, and the two halves are spread apart, that is, they are moved away from each other and from the pit. In performing these cutting and spreading functions, the known machines have frequently subjected the fruit to greater damage than is desired.

As examples of such damage, insufficient separation of the fruit halves from each other and from the pit, or incomplete slicing of the flesh about the pit prior to spreading of the halves caused ragged tearing of the flesh during spreading; forcing of the pit entirely out of the fruit through an end thereof bores or plows an opening in the flesh around said end; and puncturing of the fruit with prongs to hold the pit against movement leaves prong marks in the fruit. Further, inadequate pit and flesh separation or ineffective holding of the pit may cause the entire pit or pit fragments to remain attached to the fruit halves. In each of these examples, the fruit has an objectionable appearance, may require subsequent manual cleaning, and usually has a reduced commercial value.

The subject invention overcomes these problems by loosening the pit while the fruit is being sliced into segments. That is, the pit is dislodged from its pit cavity while the flesh is sliced around substantially the entire circumference of the pit. In addition, the pit is firmly held during dislodgement and thereafter while the halves are spread apart. The spreading action, therefore, becomes essentially one of moving the separated segments apart and discharging them.

Although the present invention is described with reference to freestone peaches, the principles of the present invention are applicable to other fruits where similar problems are involved.

Accordingly, it is an object of the present invention to provide an apparatus for splitting and pitting fruit with a minimum of damage to the fruit.

Another object is to provide a method and an apparatus for cleanly separating segments of a fruit from each other and from the pit thereof.

Another object is to provide an apparatus for gently loosening and breaking the connection between the flesh and the pit of a fruit prior to moving the segments of the flesh away from each other and from the pit.

Another object is to provide means for dislodging a pit from its pit cavity during slicing of the fruit into segments.

Another object is to provide apparatus adapted to firmly grasp and to move a fruit pit axially of its surrounding flesh while the flesh is being severed circumferentially of the pit.

Another object is to provide an apparatus for splitting and pitting the fruit on a continuous, as contrasted with an intermittent, basis.

These objects, together with other objects and advantages of the present invention, will become apparent from the following description and accompanying drawings in which.

Referring more particularly to the drawings, the apparatus of the subject invention includes a frame 20 (FIG. 1) having a pair of front legs 21, a pair of rear legs 22, upper side members 24 rigidly interconnecting upper ends of the front and rear legs on corresponding sides of the frame, lower side members 26 rigidly interconnecting lower end portions of corresponding legs, a plurality of rear crossbars 27 interconnecting the rear legs and in vertically spaced relation to each other, a lower rear crossbar 28 interconnecting the lower side members, a front base member 29 rigidly interconnecting the lower end of the front legs, and a substantially horizontal platform 31 secured to the rear end portions of the upper side members.

Figure 2:
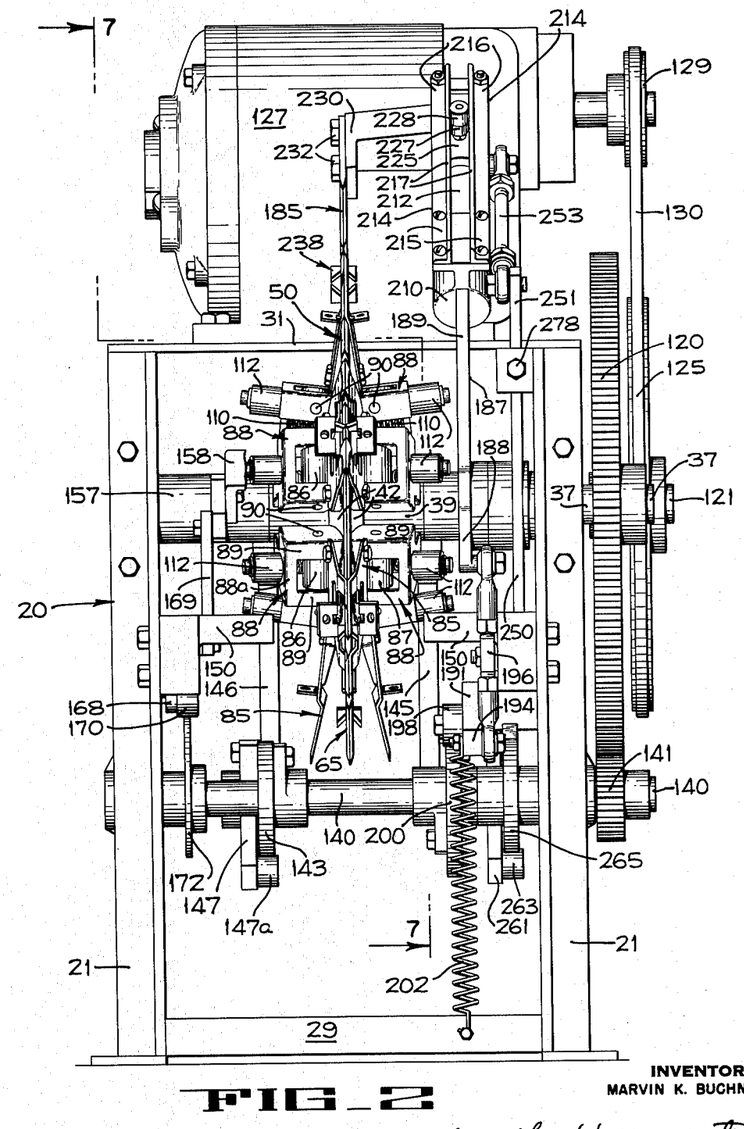
FIG. 2 is an enlarged front elevation of the apparatus illustrated in FIG. 1.
Figures 4, 5:
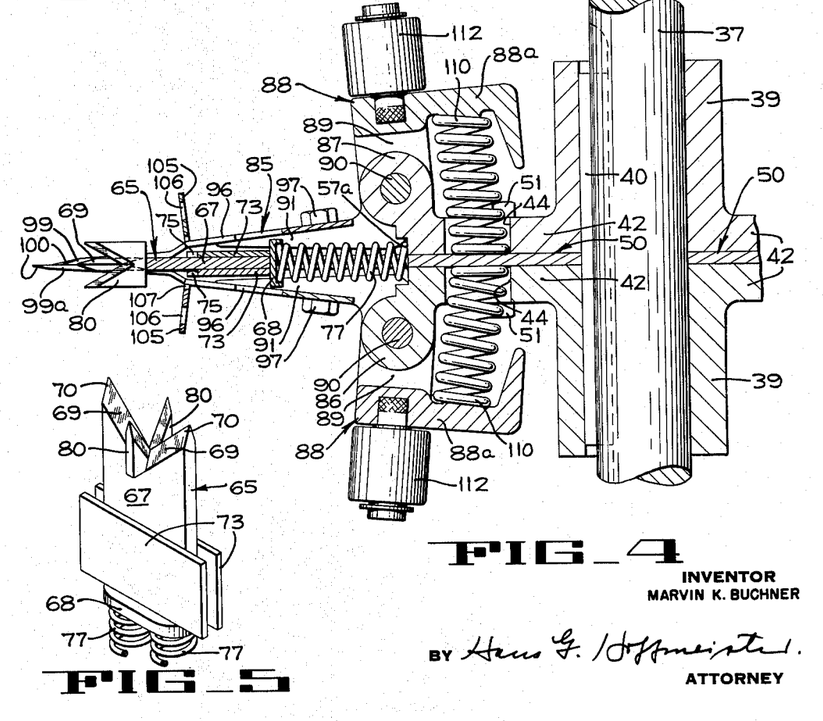
FIG. 4 is a fragmentary horizontal section taken along line 4—4 of FIG. 3, and showing the inner knives in a closed fruit receiving position.
FIG. 5 is a perspective of one of the inner pit engaging blades and its associated springs, the latter being only partially shown, it being noted that said blade and springs are even further enlarged from their showings in FIGS. 3 and 4.

Bearings 36 are secured to the upper end portions of the front legs 21 and are in horizontal alignment transversely of the frame. A main shaft 37 is journaled in these bearings 36 and extends transversely of the frame. With reference to FIGS. 2 and 4, a pair of hubs 39 are secured to the main shaft 37 by a key 40. The hubs provide flanges 42 projecting radially outwardly therefrom in spaced relation axially of the shaft. The flanges provide a plurality of pairs of aligned bores 44, for a purpose to be described, spaced circumferentially about the shaft.

A circular fruit carrying disc 50 (FIGS. 3, 4 and 6) which is disposed between the flanges 42, is secured to the shaft 37 for rotation therewith by bolts 51. The disc 50 has an outer sharpened cutting edge 53 (FIG. 3) and a plurality of slots 55 extending radially inwardly from said edge. Each slot has an outer enlarged section 56 providing an open outer end, and an inner section 57 which has a transverse dimension less than the transverse dimension of the outer section and an end wall 57a adjacent the periphery of the flanges 42. The slots are spaced circumferentially about the disc (FIG. 6) with the spacing between each pair of adjacent slots being substantially the same.

Figure 3:
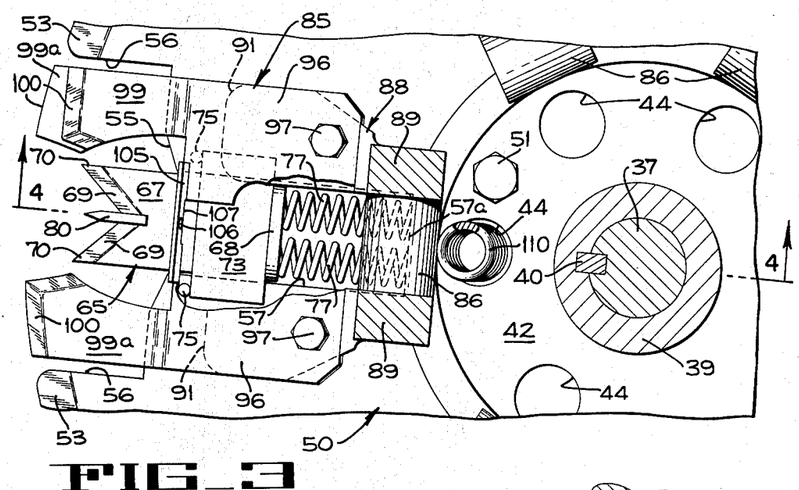
FIG. 3 is an enlarged, fragmentary section of a portion of the subject apparatus with parts broken away.

A plurality of inner pit engaging blades or pit-backup members 65 (FIG. 5) are individually slidably fitted in the slots 55 (FIGS. 3 and 4). Each blade includes a shank 67 fitted in the inner section 57 of its respective slot for slidable movement radially of said shaft 37, an inner transverse base plate 68 secured to the shank in opposed relation to the inner end of slot, and an outer V-shaped knife edge 69 on the shank. The knife edge terminates in a pair of tips 70 and provides a pit receiving notch therein. Rectangular guides 73 are secured to the shank on opposite sides thereof and provide opposite ends in slidable overlapping relation to the disc 50. Stop pins 75 are secured to the disc, project outwardly in opposite directions therefrom, and are adjacent to opposite sides of the slots. Each inner pit engaging blade is thereby mounted for movement radially of the main shaft 37 between an outer pit receiving position (FIGS. 3 and 12), defined by the abutment of the guides with their respective stop pins, and an inner pit dislodging position (FIG. 13) spaced radially inwardly of the receiving positions. Coiled compression springs 77 (FIGS. 3 and 4) are located in the slots between the base plates 68 of the blades and the inner ends of the slots; these springs yieldably urge the pit-engaging blades into their pit-receiving positions wherein the guides abut their respective stop pins. It is to be noted that the slots and the inner blades have common center lines radially related to the main shaft.

With reference to FIG. 5, it is noted that an auxiliary V-shaped lateral pit engaging blade 80 is secured to the shank 67 of the inner blade 65 and is projected endwardly therefrom perpendicularly of the outer knife edge 69. As will be understood more fully hereinafter, the auxiliary blade is optional and is provided in the subject apparatus under certain conditions.

A plurality of pairs of inner fruit spreading knives 85 (FIGS. 3 and 4) are mounted on the disc 50 with a pair of knives being associated with each lot 55 and pit engaging blade 65. For mounting the inner knives, pairs of opposed intermediate hinge sleeves 86 and 87 (FIG. 4) are integrally formed on the periphery of the flanges 42 in circumferentially spaced relation therearound. The sleeves 86 and 87 in each pair are on opposite sides of the inner ends of the associated slot 55.

Inasmuch as all of the spreader knives 85 are of identical construction and are similarly attached to the disc 50, only one knife and its mounting are described at this point. Each inner knife 85 is mounted on a bracket 88 (FIG. 3) which includes a plate portion 88a (FIG. 2) from which two spaced arms 89 project. The arms 89 are disposed on opposite sides of one of the hinge sleeves 86 and are pivotally connected thereto by a hinge pin 90 (FIG. 4) which extends transversely of the main shaft 37. Each mounting bracket 88 also has a pair of spaced mounting arms 91, each of which projects outwardly from one of the arms 89.

Each spreader knife 85 (FIG. 6) is a generally U-shaped member which has two wings 96 overlying the mounting arms 91 and secured thereto by bolts 97. Spaced knife members 99 and 99a project outwardly from the wings 96 and overlie the outer section 56 of the corresponding slot 55. These knife members are of slightly different lengths and each has an outer knife edge 100. As seen in FIG. 3, the shorter knife member 99 of each U-shaped knife is opposite to the longer knife member 99a of the U-shaped knife directly opposite it.

A fruit supporting or positioning plate 105 (FIG. 4) is secured between the wings 96 of each inner knife 85 and projects substantially normally outwardly therefrom. Each plate has a hole 106 therein which may be used to receive a bolt or the like of a pad (not shown) that may be attached to the plate to increase the thickness of the plate. An opening 107 is formed in the plate adjacent to its associated wing 96 for a purpose to be described.

The spreader knives 85 in each pair are thus mounted for movement relatively to the disc 50 between a closed, fruit receiving position (FIG. 4) with opposed knife members 99 in engagement and contiguous to a plane containing the disc, and an open fruit spreading position (lower part of FIG. 2) with said knife members in spaced relation to each other. In the closed positions of the knives (FIG. 4), the openings 107 are in radial alignment with and receive the opposite sides of the lateral pit engaging blade 80 during movement of the inner blade from its receiving position into its dislodging position.

Coiled knife springs 110 (FIG. 4) are positioned in the bores 44, bear against the disc 50 and the underside of the plate portion 88a of bracket 88, and yieldably urge the inner knives into their closed positions. Cam following knife rollers 112 are rotatably mounted on the plate portions 88a for use in moving the knives into their open positions. It is to be noted in FIG. 6 that the axes of all the cam following rollers on each side of the disc are intersected by an imaginary common circle concentric to the main shaft 37.

Figure 7:
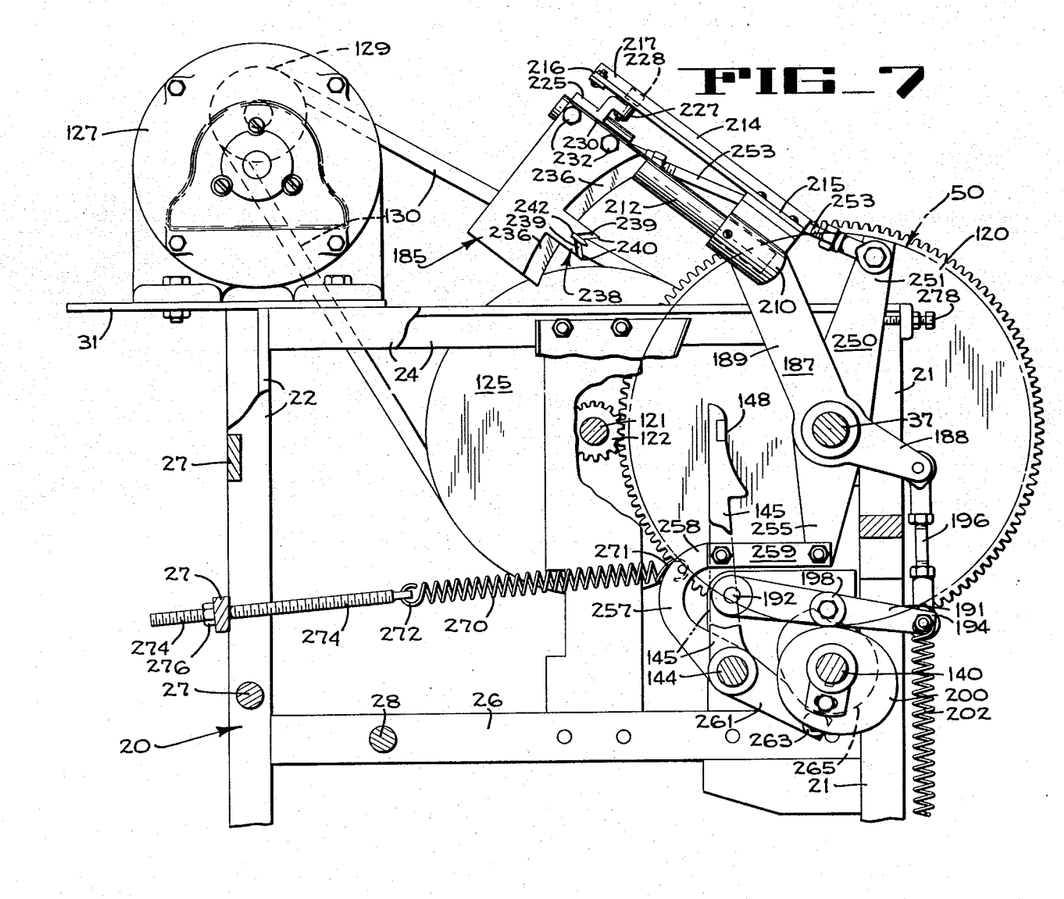
FIG. 7 is a fragmentary longitudinal vertical section taken along line 7—7 of FIG. 2 but on a reduced scale from that of FIG. 2 and also with parts of the apparatus being broken away.

It is also believed evident from the foregoing that the inner knives 85 are mounted for rotation with the disc 50. For imparting rotary movement to the disc, a large driven gear 120 (FIG. 7) is secured to the main shaft 37. An intermediate shaft 121 is mounted in the frame 20 rearwardly of and in substantially the same horizontal plane with the main shaft. A drive pinion 122 is secured to the intermediate shaft and is in mesh with the driven gear. A driven pulley 125 is secured to the intermediate shaft outwardly of the pinion. A motor 127 is supported on the platform 31 and provides a drive pulley 129 in a common vertical plane with the driven pulley. A pulley belt 130 extends around the drive and driven pulleys and imparts rotary movement to the intermediate shaft and thereby to the main shaft upon energization of the motor.

The disc 50 is thus rotated by the motor 127 so as to move each pair of inner knives 85 in an arcuate path successively past a fruit feeding station 135 (FIG. 6) at the front portion of the frame 20 and a fruit separating station 136 spaced circumferentially of the disc from the feeding station; it is to be noted that these stations are substantially diametrically opposite each other with respect to the disc.

For controlling spreading movement of the inner knives 85, as well as for controlling other portions of the subject apparatus, a camshaft 140 (FIG. 6) is journalled in the frame 20 beneath the main shaft 37. A driven pinion 141 (FIG. 2) is secured to the camshaft and is in mesh with the driven gear 120. In the disclosed embodiment of the subject invention, the driven pinion 141 and camshaft 140 rotate six times for each revolution of the driven gear 120 and the disc 50; this ratio of six to one is not a factor limiting the invention since said ratio simply corresponds to the number of pairs of inner knives which are employed. A knife control cam 143 (FIGS. 2 and 6) is secured on an end portion of the camshaft 140.

A mounting shaft 144 (FIG. 6) is also journalled in the frame 20 in rearwardly spaced, substantially parallel relation to and in substantially a common horizontal plane with the camshaft 140. A knife control arm 145 (FIGS. 2 and 7) and a knife control bell crank 146 (FIGS. 2 and 6) are secured to opposite ends of the mounting shaft 144 for unitary fore and aft rocking movement therewith. The bell crank 146 has a lower end portion 147 that carries a roller 147a which rides along the knife control cam 143. The upper ends of both the bell crank 146 and the arm 145 are provided with upper arcuate cams 148. Since the bell crank and the arm 145 are keyed to the same shaft, movement of the bell crank by control cam 143 controls movement of arm 145 also. The bell crank and the arm are mounted for movement between inner fruit spreading positions wherein their spreading cams 148 are concentric to the main shaft 37 (FIG. 6) and are in contact with the knife rollers 112, and outer retracted positions spaced from said knife rollers. During rotation of the disc and the camshaft, the knife control cam 143 intermittently moves the spreading cams into contact with the rollers as the knife rollers successively move through the separating station 136. When the knife rollers associated with a pair of inner knives 85 are engaged by the spreading cams, said pair of knives are pivoted into spreading positions wherein they remain as the rollers travel along the spreading cams.

Stationary knife cams 150 (FIGS. 2 and 6) are secured to the front legs 21 of the frame 20; these stationary cams extend inwardly on opposite sides of the disc 50 and thence concentrically of the main shaft 37 to provide extensions of the spreading cams 148 when the latter are in their spreading positions. The knife rollers 112 leave the spreading cams and ride onto the stationary cams 150 so that the knives remain in their spreading positions for approximately ninety degrees of travel. Continued rotation of the knife cam 143, after a pair of rollers leave the spreading cams, allows the arm 145 and the bell crank 146 to return to retracted positions by gravity.

Figure 6:
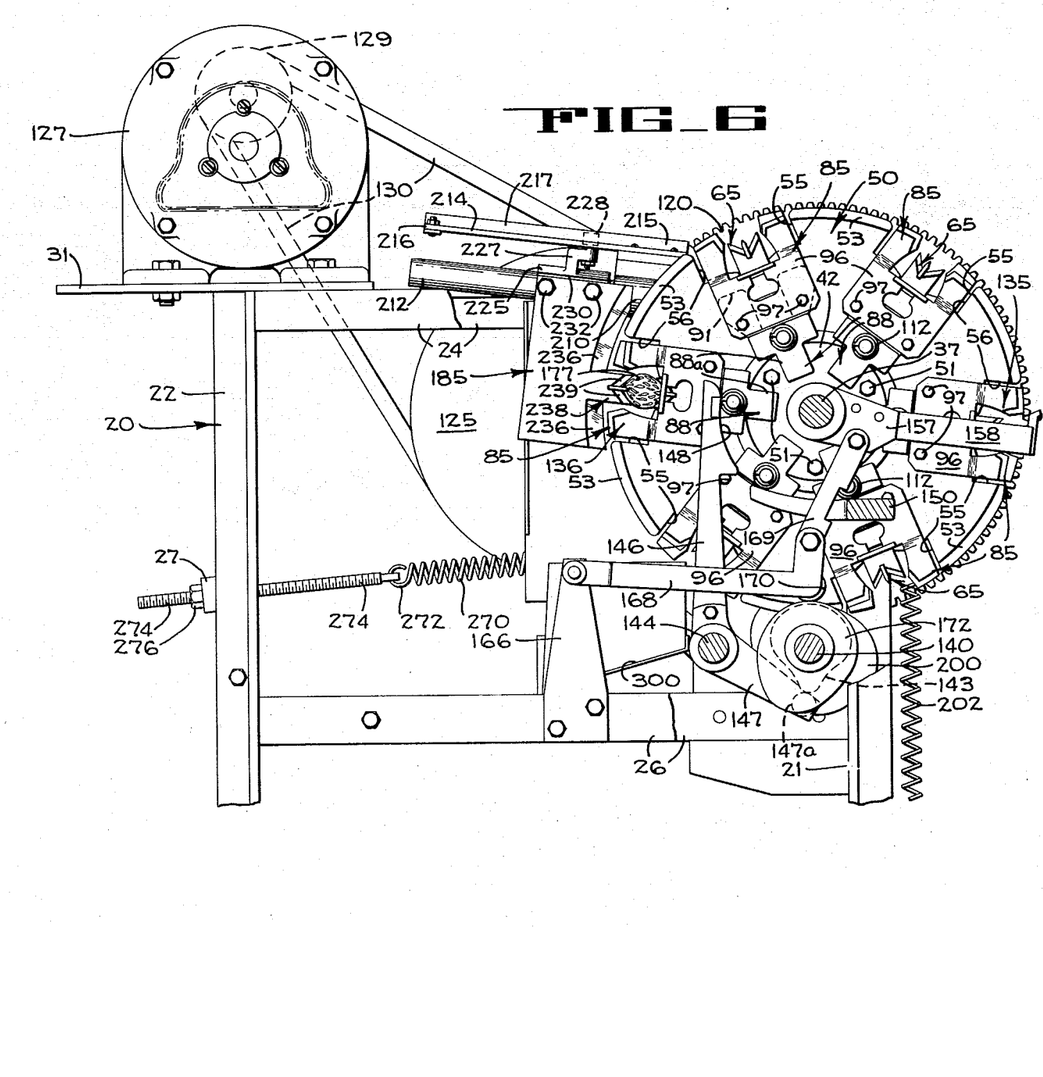
FIG. 6 is an enlarged fragmentary side elevation of the apparatus illustrated in FIG. 1, as seen when looking toward the near side of the apparatus as illustrated in FIG. 1, but with portions broken away to show details of construction.

Freestone peaches, or other fruit, 155 (FIG. 12) are fed into the apparatus at the fruit feeding station 135 (FIG. 6). To support the fruit at this station a movable support mechanism is provided. This mechanism includes an L-shaped bar 158 which projects forwardly and radially from the main shaft 37 in laterally adjacent spaced relation to one side of the disc 50. At its inner end the bar 158 is secured to a bushing 157 journalled on shaft 37. At its outer end, the bar curves inwardly in front of the periphery of the disc, and a forwardly inclined V-shaped fruit cup 159 is secured to the bar. The cup provides an apex 161 (FIG. 1) in the same vertical plane as the disc.

With reference to FIG. 6, an upstanding mounting bracket 166 is secured to a lower side member 26 of the frame 20. An L-shaped arm 168 has a rear end pivoted on the mounting bracket and a forward upturned end portion pivotally connected to the L-shaped bar 158 of the feed mechanism by a link 169. A roller 170 is mounted on the arm 168 and rides on a fruit feeding cam 172 connected to the camshaft 140. As the camshaft is rotated, the V-shaped fruit feed cup 159 is moved in an arc concentric to the main shaft 37 between a lower position (FIG. 6) at the feeding station 135 and an upper position (not shown), upwardly angularly spaced from the lower position.

Figure 12:
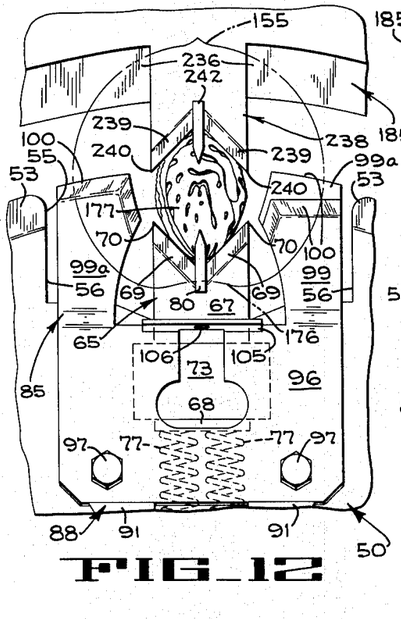
FIG. 12 is an enlarged fragmentary side elevation of a portion of the subject apparatus as it approaches a fruit separating station and of a peach positioned on the apparatus.
Figure 14:
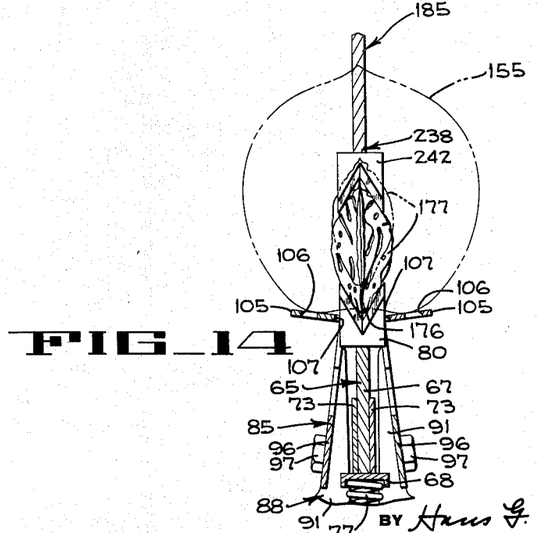
FIG. 14 is a section taken on line 14—14 in FIG. 13.

Assuming that both the cup 159 and a pair of the spreader knives 85 are located in the feeding station 135, and are traveling upwardly together, it will be evident that the cup will hold the peach in alignment with the knives for a sufficient length of time to permit the peach to be slid radially inwardly onto the knives 85 and the pit engaging blade 65. For this description, attention is directed to FIGS. 6, 12 and 14; although FIGS. 12 and 14 are not at the feeding station and do not show the cup, these figures do illustrate the position the peach attains after it has been pushed off the cup 159 onto the blades. Although a peach is not shown at the feeding station in FIG. 6, it will be evident that the peach is initially positioned on the cup with its stem end 176 facing the disc 50, with its suture plane coplanar with the disc and the cutting edges 100, and with its stem-blossom axis in alignment with the center line of the pit engaging blade. It is to be noted that in this posiion, the axis of the pit 177 is in alignment with the blade. As each pair of knives moves upwardly from the fruit feeding station, the cup is moved therewith so as to maintain alignment of the stem-blossom axis of the peach with the blade. By the time the cup reaches its upper position, the peach has been moved radially inwardly, by an operator or by a mechanical feed device and is impaled on the knives with the latter cutting into the flesh of the peach along its suture plane, with the stem end of the peach in engagement with or closely adjacent to the fruit supporting plates 105, and with the inner end of the pit received in the notch of the knife edge 69 of the blade. It is also to be noted that the knives and blade partially slice the peach into segments, these segments being halves in the disclosed embodiment; that is, approximately the radially inner or leading half of the peach is severed at this stage of the operation.

For completing severance of the peach halves, an outer knife 185 (FIG. 7) is provided. The outer knife is mounted for reciprocable movement in an outer arcuate path concentric with the main shaft 37 by a blade aligning crank 187 journalled on the main shaft. The aligning crank includes a lower control portion 188 and an upper mounting portion 189 in obtuse angular relation to the control portion. A crank control bar 191 has a rear end 192 pivotally mounted in the frame 20 in upwardly spaced, substantially parallel relation to the mounting shaft 144. The control bar has a front end 194 pivotally connected to the control portion of the crank by a telescopically adjustable link 196. A roller 198 is mounted on the bar intermediate its ends and rides on a knife reciprocating cam 200 secured to the camshaft 140. A bar depressing spring 202 has an upper end connected to the front end of the control bar and a lower end (FIG. 1) connected to the base member 29 of the frame for yieldably urging the roller 198 (FIG. 7) downwardly against the reciprocating cam.

A socket member 210 (FIGS. 2 and 7) is secured to the mounting portion 189 of the crank 187. A cylindrical slide rod 212 is fitted in and secured to the socket member and projects outwardly therefrom in substantially parallel relation to a radius of the disc 50. A pair of rails 214 have inner ends 215 secured to the socket member and interconnected outer ends 216. The rails provide elongated flanges 217 in spaced parallel relation to each other and in laterally adjacent spaced parallel relation to the slide rod.

Still considering the mounting of the outer knife 185, a mounting sleeve 225 is slidably fitted on the slide rod 212 for movement inwardly and outwardly thereon. An arm 227 is secured to the sleeve 225 and projects toward the rails 214. A guide wheel 228 is mounted on the arm 227, extends between the rails 214, and rolls on one or the other of the flanges 217. A bracket 230 is extended from the sleeve substantially radially of the slide rod and mounts the outer knife thereon by screws 232. It is noted that the outer knife is in a substantially common plane with the disc 50 (FIG. 2).

The outer knife 185 provides a knife edge 236 in opposed relation to the cutting edge 53 of the disc 50 (FIGS. 2 and 6). Also, an outer pit engaging blade 238, similar in form to the inner pit engaging blade 65, projects inwardly from the knife edge 236 of the outer knife. The outer blade has a V-shaped knife edge 239 (FIGS. 1 and 6) terminating in tips 240 and providing a pit receiving notch. As with the inner spreader blade 85, the outer blade may be optionally provided with an auxiliary, lateral pit-engaging blade 242. Inasmuch as the outer knife is in a common plane with the disc, the outer and inner pit engaging blades are in coplanar relation, as are the auxiliary blades when employed. The outer knife is moved by the blade aligning crank 187 (FIGS. 8 through 11) from an upper rest position to a lower position as each pair of inner knives 85 approach the fruit separating station 136. During this movement, the aligning crank 187 maintains the outer blade 185 in alignment with the inner knife 85 and with the slot 55 in which such blade is mounted.

Figure 8:
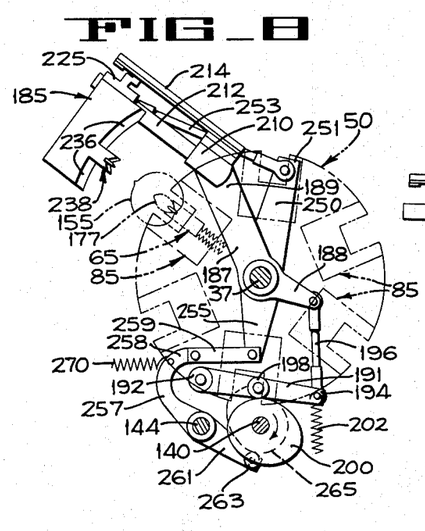
FIGS. 8, 9, 10 and 11 are diagrammatic views of a portion of the subject apparatus taken along the same section line as FIG. 7 but on a scale reduced from that of FIG. 2 and showing the subject apparatus in successive stages of operation in splitting and pitting a peach.

As the outer knife 185 swings in an outer arcuate path concentric with the main shaft 37, as controlled by the blade aligning crank 187, the outer knife is moved toward and away from the disc 50 between an inner fruit engaging position (FIG. 9) and an outer retracted position (FIG. 8). For this purpose, a knife sliding lever 250 (FIG. 7) is journalled on the main shaft. The sliding lever has an upper end 251 pivotally connected to the mounting sleeve 225 by a telescopically adjustable link 253. The knife sliding lever also has a lower end 255. A J-shaped lever control bar 257 is journalled on the mounting shaft 144 and provides an upper end 258 pivotally connected to the lower end of the lever 250 by a strap 259 and a lower end 261 adjacent to the camshaft 140. A roller 263 is mounted on the lower end of the bar and rides against an outer knife control cam 265 secured to the camshaft.

Figure 1:
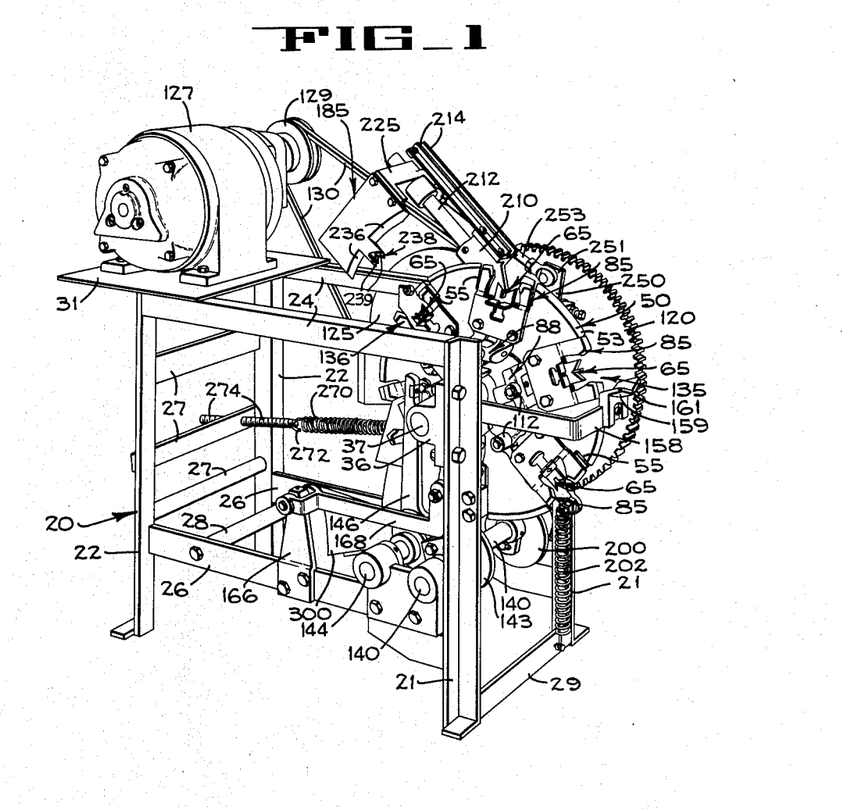
FIG. 1 is a perspective of a fruit splitting and pitting apparatus embodying the principles of the present invention.

The outer knife 185 is yieldably urged into its upper, retracted position by a knife retracting spring 270 having a forward end 271 connected to the upper end 258 of the bar 257. A threaded rod 274 is slidably extended through one of the front cross bars 27 of the frame and has a front end connected to the rear end 272 of the spring. A nut 276 is threaded on the rear end portion of the rod for adjusting the tension of the spring. The retracting spring, therefore, urges the lever 250 in a clockwise direction (FIG. 7) about shaft 37 and into engagement with an adjustable stop bolt 278 which is mounted on the upper end portion of one of the front legs 21 of the frame 20.

In summarizing the steps of the subject method and the operation of the subject apparatus, let it be assumed that the illustrated embodiment of the pitter is initially in the position of FIG. 6. That is, the inner spreader knives 85 at the feeding station 135 are in closed, fruit-receiving position and the cup 159 is in its lower position opposite to these knives. Upon energization of the motor 127, the disc 50 is rotated in a counterclockwise direction whereas the camshaft 140 is rotated in a clockwise direction.

A peach 155, not shown in FIG. 6, is placed on the cup 159 and impaled on the knives 85 in the manner previously described. The peach is partially sliced along its suture plane into halves. It is significant that the stem ends of these halves engage, or are closely adjacent to, the supporting plates 105; that the inner pit engaging blade 65 penetrates the peach in its suture plane and receives the inner end of the pit 177 therein; and that approximately the inner half of the peach is sliced by the inner knives and the inner blade in closely adjacent relation to the pit.

As long as the peach 155 is accurately positioned on the inner knives, that is, with the knives impaling the peach along its suture plane and with the inner end of the pit properly seated in the inner blade 65, the auxiliary blades 80 and 242 need not be employed; when the auxiliary blades are employed, adequate pit engagement is obtained even if the suture plane of the peach is not coplanar with the disc 50 and inner knives 85. Since the auxiliary blades are illustrated, their presence is assumed in the following description.

The cup 159 (FIG. 6) moves upwardly with the impaled peach 155 to assist in its proper placement on the inner knives 85. After approximately twenty degrees of upward travel, the cup returns to the feeding station 135 where it remains, awaiting movement of a successive pair of inner knives into the feeding station.

Figure 9:
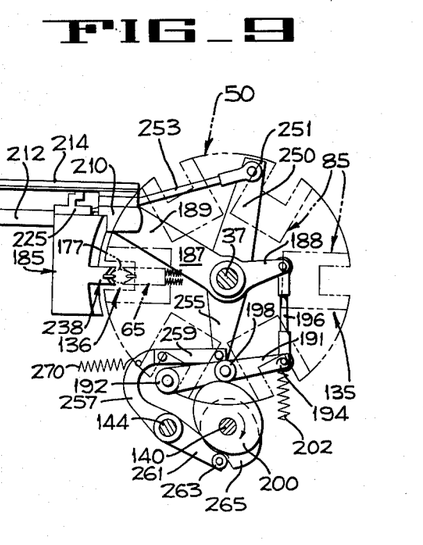
Figure 10:
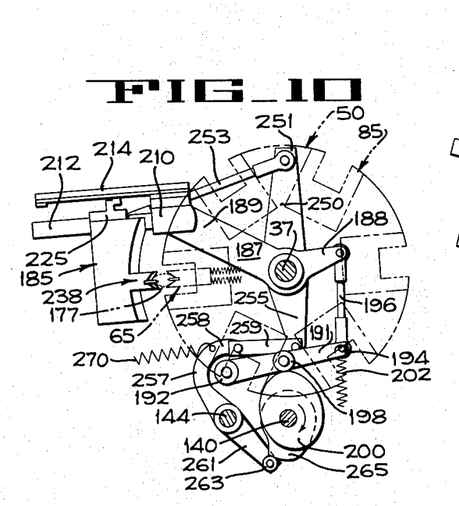

The impaled peach 155, however, continues movement toward the separating station 136 in a counterclockwise direction, as viewed successively in FIGS. 8 through 11. When the axis of the impaled peach is aligned with the center line of the outer blade 238 (FIG. 8), the blade aligning crank 187 moves the outer blade from its upper position toward its lower position while simultaneously maintaining alignment of the outer blade with the axis of the peach. During the first part of the downward movement of the outer knife 185 and outer blade, the sliding lever 250 is stationary and is in the position illustrated in FIG. 8. Therefore, the outer knife and outer blade slide inwardly toward the disc 50, that is from the FIG. 8 position to a position slightly closer to the disc than is illustrated in FIG. 9; FIG. 9 actually shows the outer knife just beginning its outward movement.

Figure 13:
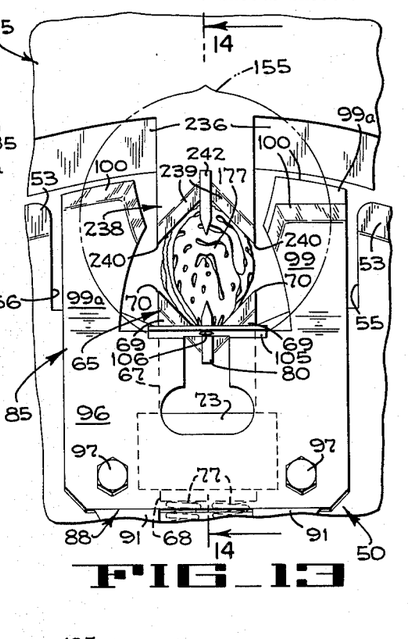
FIG. 13 is a view similar to FIG. 12 but showing the apparatus and the fruit in a more advanced stage at the fruit separating station.

As the outer knife 185 moves inwardly, the outer blade 238 and the outer knife slice into the peach 155 in its suture plane (FIG. 12). Simultaneously with this slicing action, the outer blade 238 engages the outer end of the pit 177 whereby the pit is grasped or clamped between the inner blade 65 and the outer blade. As the outer blade continues its inward movement, it moves the pit and the inner blade inwardly against the urgence of the springs 77 (FIG. 13). The divided halves of flesh of the peach 155 are held against inward movement with the pit by the supporting plates 105. The pit, therefore, is moved axially of the fruit with respect to the flesh. In this manner, the pit is gently loosened from the flesh and is dislodged from its pit cavity, as illustrated in full lines in FIG. 14 as compared with its cavity position in dashed lines. In the innermost position of the outer knife and blade, the peach is substantially completely severed about the pit into halves, but the pit is only partially displaced from its normal position within the peach. That is, the dislodgement of the pit as provided by the present invention does not cause the pit to bore or plow through the stem end 176 of the flesh. The dislodgment simply serves to gradually loosen and break the connections between the flesh and the pit and to condition the fruit for subsequent spreading apart of the divided halves. In this regard it is also noted that the halves of the peach are separated enough by the inner knives 85 in their closed position to allow for the described amount of axial movement of the pit without furrowing into the flesh.

After the pit 177 is dislodged and the peach 155 is substantially completely sliced about the pit (FIG. 6), the spreading cams 148 move into engagement with the knife rollers 112 and abruptly spread the inner knives 85 apart. The severed halves of the peach are moved away from each other and from the pit and fall from the disc 50 into a chute 300 mounted in the frame 20 below the separating station 136. The pit, however, remains firmly grasped between the blades 65 and 238 and does not remain attached to the flesh or move therewith.

It is of real significance that the cut and exposed surfaces of the peach halves are substantially smooth and undamaged because of the preliminary loosening and separating of the pit 177 from the flesh and the nearly complete slicing of the flesh about the pit. Accordingly, there is no appreciable tearing of the peach flesh when the knives are spread apart. Instead, the spreading of the knives simply serves to urge the peach halves off from the disc and to break any minimal pit-flesh connections which may remain.

Just after dislodgment of the pit 177 and severance of the fruit halves, the slicing lever 250 moves counterclockwise (FIG. 10) and moves the outer blade 238 out of the slot 55; as the outer blade is withdrawn from the slot, said blade continues its counterclockwise travel with the disc 50 so as to avoid engagement of the disc with the outer blade. During this time, the pit remains clamped between the blades 65 and 238. When the inner blade reaches its outer pit receiving position, the outer blade continues its outward movement so that the pit is released and falls from the disc into the chute 300 (FIG. 6). The inner knives and the inner blade continue movement with the disc toward the feeding station 135 for repeat operations.

Figure 11:
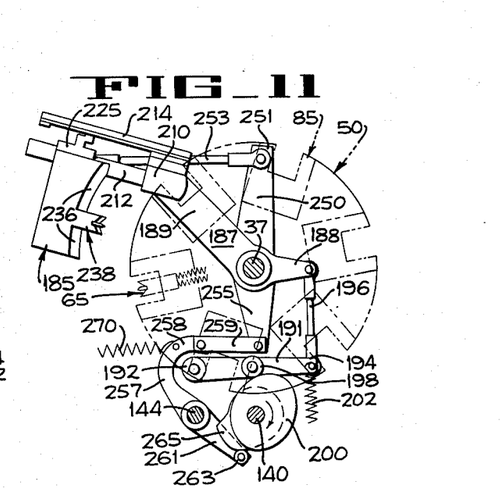

After releasing the pit 177, the outer blade 238 and the outer knife 185 are moved upwardly by the blade aligning crank 187 (FIG. 11). When the outer knife and blade reach their upper rest position, they are ready for alignment with a successive pair of inner knives 85 (FIG. 1) and for repeating their functions as described above.

From the foregoing, it is evident that the present invention provides an apparatus for splitting and pitting fruit which overcomes several problems of the prior art. The subject method and apparatus provide for simultaneously substantially completely slicing the flesh of a fruit about its pit while loosening the pit from the flesh and for dependably holding the pit while spreading the sliced segments apart. Since the knives 85 and 185 and the pit engaging blades 65 and 238 enter the fruit in substantially a common plane, in the preferred form of the invention, there is no appreciable marking of the flesh. The resulting fruit segments provide exposed cut surfaces which are clean and smooth, and are not marred by the appearance of the pit or pit fragments nor appreciable blade or tool marks. Since damage to the fruit is minimized, the fruit is of a higher quality and of greater commercial value.

It is to be understood that the disclosed steps and structure embodiments of the present invention are capable of modification and variation without departing from the principles of the invention, and that the scope of the invention should be limited only by the scope and proper interpretation of the claims appended hereto.

The invention having thus been described, what is believed to be new and desired to be protected by Letters Patent is:

1. In a fruit pitter, a support, an elongated pit engaging blade mounted in said support for reciprocating movement longitudinally of said blade between a pit receiving position and a pit dislodging position, resilient means urging said blade in a predetermined direction into its pit receiving position, means mounted on said support for positioning a pit-carrying fruit in coaxial alignment with said blade when said blade is in said pit receiving position and with the pit engaging said blade, and means projecting from said positioning means for engagement with the flesh of a fruit positioned on said blade to limit movement of said flesh with its pit when force is applied to said pit to move said blade and the engaged pit in a direction opposite to said predetermined direction to pit dislodging position against the urging of said resilient means.

2. In an apparatus for loosensing a pit from the flesh of the fruit surrounding the pit, said fruit having a stem blossom axis passing through said pit, a support; means in said support for holding a fruit and for limiting axial movement of the flesh of the fruit in a predetermined direction; and spaced pit engaging means mounted in said support for movement relatively to said holding means and along a path aligned with the axis of a fruit in said holding means, said engaging means also penetrating a fruit in said holding means, clamping the pit of the fruit therebetween, and moving the clamped pit in said predetermined direction and relatively to said flesh so as to loosen said pit from the flesh.

3. In an apparatus for splitting and pitting a fruit, a support; means in said support for holding a fruit and for limiting movement of the flesh of the fruit in a predetermined direction and for partially slicing said flesh around the pit of the fruit; and spaced cutting and pit engaging means mounted in said support for movement in said predetermined direction and relatively to said holding and slicing means for completing the slicing of the flesh around said pit to divide the flesh into separable segments, clamping the pit of the fruit therebetween, and moving the clamped pit in said predetermined direction and relatively to said separable segments of flesh so as to loosen said pit from said flesh simultaneously with completing the slicing of the flesh.

4. In an apparatus for splitting and pitting a fruit, a support; spreadable fruit slicing means mounted in said support for holding a fruit so as to limit movement of the flesh of the fruit in a predetermined direction along the axis of the fruit and for partially slicing said flesh around the pit of the fruit; spaced pit engaging and cutting means mounted in said support for movement in said predetermined direction relatively to said holding and slicing means and along a path aligned with the axis of a fruit on said holding and slicing means for completing slicing of the flesh around said pit to divide the flesh into separable segments, clamping the pit of the fruit therebetween, and moving the clamped pit in said predetermined direction and relatively to said separable segments of flesh so as to loosen said pit from said flesh simultaneously with completing slicing of the flesh; and means mounted in said support for spreading said holding and slicing means after said pit is loosened from said flesh for moving said separable segments away from each other and from said clamped pit.

5. In an apparatus for dislodging a pit from a pit cavity in the outer portion of a fruit surrounding the pit, a support, a first pit engaging member mounted in said support for movement along a predetermined path in a first direction toward a pit receiving position and in a second direction opposite to said first direction toward a pit dislodging position, means yieldably holding said first member in its pit receiving position, a second pit engaging member, means mounting said second member in said support for movement in said path toward and away from said first member, fruit positioning means secured to said support adjacent to said path and said first member for positioning the pit of a fruit in said path between said members and for precluding movement of the outer portion of the fruit surrounding said pit in said second direction, and powered means connected to said mounting means for moving said second member toward said first member for clamping a pit in said path between said members and for urging said first member into its dislodging position while said pit is clamped between said members and while the outer portion of the fruit is restrained from movement in said second direction whereby said pit is moved relatively to and is dislodged from its cavity in said outer portion of said fruit.

6. In an apparatus for loosening a pit of a fruit from the flesh portion of the fruit surrounding the pit, a support having an open end slot, a first pit engaging member slidably received in said slot for movement in first and second directions respectively toward and away from said open end, a stop, means mounting the stop on said support in the path of movement of said first member for limiting its movement toward said open end upon engagement of said first member with said stop, means in said slot between said support and said first member for resiliently urging said first member against said stop, a second pit engaging member, means mounting said second member in said support for movement between a pit engaging position projecting into the open end of said slot and a retracted position withdrawn from said slot, a fruit engaging plate, means mounting said plate on said support so that said plate projects laterally outwardly from said slot whereby with a fruit positioned on said support with its suture plane coplanar with the plane of said slot and with said first member engaging an end of the pit of said fruit, the outer flesh portion of said fruit is disposed for engagement with said plate upon movement of said flesh portion in said second direction, and control means connected to said second member and to the mounting means therefor for moving said second member between pit engaging and retracted positions whereby in said pit engaging position the second member penetrates said fruit on said support, engages the pit thereof at the opposite end from said first member, and moves said pit and first member in said second direction relatively to said outer flesh portion.

7. In an apparatus for simultaneously axially displacing the pit of a fruit from its pit cavity and slicing the flesh of the fruit around the pit, support means providing a fruit cutting edge and a slot extending inwardly from said edge, a first pit engaging member mounted in said slot for slidable movement in a first direction toward said edge and in a second direction away from said edge, means in said slot between said member and said support means for yieldably urging said member toward said edge, means borne by said support means and engageable with said member for limiting movement thereof toward said edge, an outer knife providing a knife edge, a second pit engaging member projecting outwardly from the edge of said knife, means mounting said knife on said support means for movement in a path with said outer member aligned with said slot between a fruit engaging position with said second member extending into said slot and said outer knife edge in opposed closely adjacent relation to the cutting edge of said support means whereby a fruit positioned on said support means in symmetrical relation to said slot is sliced about its pit by said support means and outer knife and whereby the pit of said fruit is engaged between said members and moved axially of the fruit, and powered means connected to said outer knife and the mounting means therefor for moving said outer knife between fruit engaging and retracted positions.

8. In an apparatus for dislodging a pit from its pit cavity in the portion of a fruit surrounding a pit, a support, a first pit engaging blade mounted in said support for movement along a predetermined path in a first direction toward a pit receiving position and in an opposite second direction toward a pit dislodging position, a stop projecting outwardly from said support in the path of movement of said blade, means yieldably urging said blade into its pit receiving position and into engagement with said stop, a pair of main knives having cutting edges and being pivotally mounted on said support on opposite sides of said blade for movement about an axis extending transversely of said path between an inner closed position wherein their cutting edges are in substantially a common plane with said blade and a spread apart open position, said knives and blade being adapted to impale a fruit in the closed position of said knives so that said blade engages the pit of the fruit and so that the flesh of the fruit is partially sliced about the pit by said knives, supporting plates projecting outwardly from said knives for engagement with a fruit thereon to limit movement of its flesh in said second direction, means mounted on said support for completing slicing of the flesh of said fruit about its pit and for engaging the pit and urging said pit and blade in said second direction relatively to said flesh of the fruit whereby said pit is axially dislodged in said fruit, and means for moving said knives from their closed position to their open position after completing slicing of said fruit and dislodging its pit thereby to move the sliced segments of the flesh away from each other and from the pit, said slicing and pit engaging means and said blade being adapted to clamp said axially dislodged pit therebetween during movement of said knives from closed position to open position.

9. An apparatus for splitting and pitting fruit comprises first and second splitting knives having cutting edges, means supporting said knives with their edges opposed to each other substantially in a common plane and for movement of the said second knife toward and away from said first knife whereby a fruit diametrically impaled on one of said knives is split when said second knife moves toward said first knife and into fruit engagement, pit engaging means positioned substantiallly in said plane in association with said knives, and said engaging means also clamping and moving the pit with respect to the fruit a distance sufficient to dislodge the pit from its cavity simultaneously with the splitting of the fruit by the knives during movement of said second knife toward said first knife.

10. An apparatus for splitting and pitting fruit comprising a frame, inner and outer splitting knives having cutting edges, means mounted in said frame supporting said knives with their edges facing each other and substantially in a common plane and for movement of said outer knife toward and away from said inner knife whereby a fruit diametrically impaled on said inner knife is split when said outer knife moves toward said inner knife and into fruit engagement, an outer pit engaging blade projecting outwardly from the cutting edge of said outer knife for engagement with the pit of said fruit and for shoving inwardly on said pit while said fruit is being split by said outer knife during movement of said outer knife toward said inner knife, means on said innner knife engageable with said impaled fruit for limiting inward movement of the flesh thereof when the pit is moved inwardly by said outer blade, and an inner blade resiliently mounted in said supporting means for engagement with the pit of a fruit impaled on said inner knife whereby the pit is clamped between said inner and outer blades when said outer knife moves toward said inner knife and during said inward movement of said pit, said inner blade being yieldable inwardly to permit said inward movement of the pit.

11. An apparatus for splitting and pitting a fruit comprising a frame, inner and outer splitting knives having cutting edges, means mounted in said frame supporting said knives with their edges facing each other and substantially in a common plane and for movement of said outer knife toward and away from said inner knife whereby a fruit diametrically impaled on said inner knife is split when said outer knife moves toward said inner knife and into fruit engagement, an outer pit engaging blade projecting outwardly from the cutting edge of said outer knife for engagement with the pit of said fruit and for shoving inwardly on said pit while said fruit is being split by said outer knife, means on said inner knife engageable with said impaled fruit for limiting inward movement of the flesh thereof when the pit is moved inwardly by said outer blade, said knife supporting means providing a slot aligned with the outer blade and having an open end for receiving said outer blade during movement of said outer knife toward said inner knife, an inner blade slidably received in said slot for movement toward and away from said open end and having a base portion, a compression spring interposed between said base portion and said knife supporting means for yieldably urging said inner blade toward said open end, guides secured to said inner blade and extending outwardly therefrom on opposite sides of said supporting means for maintaining said inner blade in said slot during movement of the inner blade, and stops projecting outwardly from said supporting means in the path of movement of said guides for limiting movement of said inner blade toward said open end, said inner blade being adapted to engage the pit of a fruit impaled on said inner knife whereby said pit is clamped between said inner and outer blades when said outer knife moves toward said inner knife and during said inward movement of said pit, said inner blade being yieldable inwardly against the urgence of said spring to permit said inward movement of said pit.

12. An appparatus for splitting and pitting fruit comprising a frame; a supporting member having opposite sides, an outer edge and a slot opening through said outer edge; means mounting said supporting member in said frame; U-shaped inner knives providing notches therein and being mounted on opposite sides of said supporting member with said notches in registration with said slot and for pivotable movement toward and away from supporting member between fruit receiving and fruit spreading positions, said inner knives having outer knife edges contiguous to a common plane in said receiving position; means yieldably urging said knives into fruit receiving position; an inner pit engaging blade fitted in said slot for slidable movement inwardly and outwardly therein between an outer fruit receiving position and an inner pit dislodging position, said blade having an outer edge spaced inwardly from the outer edge of said inner knives in the receiving position of said blade whereby when a fruit is diametrically impaled in the suture plane thereof on said inner knives and said inner blade and is bridges across said slot and said notches, the pit of the fruit is contiguous to said inner blade; supporting plates projecting outwardly from said inner knives for engaging the flesh of a fruit impaled on said knives and for limiting movement of said flesh inwardly with respect to said slot; an outer knife having a knife edge; an outer pit engaging blade projecting from said edge of the outer knife; means mounting said outer knife on said frame for movement between a fruit engaging position with its knife edge in opposed closely adjacent relation to the outer edges of said inner knives and with the outer blade extending into said slot in edgewardly opposed relation to said inner blade so that said outer knife and blade slices the flesh of a fruit impaled on said inner knives whereby the flesh is substantially completely severed around the pit and so that said outer blade engages the pit of the fruit and thereby moves the inner blade into said dislodging position for dislodging the pit from the pit cavity during severing of the flesh; and means mounted on said frame and associated with said inner knives for moving said knives from their receiving position to their spreading position after movement of said outer blade into said slot, said blades being operative to hold said pit therebetween during movement of said main knives into said spreading position.

13. In a fruit splitting and pitting apparatus, inner fruit splitting and pit engaging means, means mounting said inner means for movement in a predetermined direction along an inner path, outer splitting and pit engaging means, means supporting said outer splitting means for reciprocating movement in opposite directions in an outer path in spaced planar relation to said inner path, said supporting means also supporting said outer splitting means for movement toward and away from said inner splitting means, means connected to said supporting means for moving said outer means in the same direction as and in alignment with said inner means, and means connected to said outer splitting means for moving said outer means toward said inner splitting means when said inner and outer means are moving in the same direction whereby the pit of a fruit positioned between said engaging means is held while the flesh of the fruit is split around said pit.

14. In an apparatus for moving a pit of a fruit axially of the fruit, an inner fruit impaling means adapted to support a fruit thereon, means mounting said impaling means for movement in a predetermined direction along an arcuate path formed on the arc of a circle having a predetermined axis as a center, said impaling means limiting movement of a fruit thereon inwardly of said path toward said axis, a slide member, means supporting said slide member so that it projects outwardly from said path in substantially parallel relation to a radius of said circle, aligning means associated with said supporting means for reciprocably moving said slide member in the same direction as said impaling means and thence in the opposite direction from said impaling means, an outer blade mounted on said slide member for slidable movement toward and away from said impaling means, said aligning means maintaining said outer blade in alignment with said impaling means during movement of said slide member in the same direction as said impaling means, and means connected to said outer blade for sliding it inwardly on said slide member into engagement with the pit of a fruit on said impaling means for moving said pit inwardly toward said axis relatively of said fruit.

15. In an apparatus for removing the pit of a fruit, a disc having an axis of rotation and a peripheral slot opening outwardly from the disc, an inner pit engaging blade received in said slot, means mounting said disc for rotation in a predetermined direction about its axis, an outer pit engaging blade adapted to fit into said slot, means mounting said outer blade outwardly of said inner blade for movement along first and second paths respectively concentrically and radially related to said disc, means associated with said blade mounting means for moving said outer blade along its first path in said predetermined direction and in alignment with said inner blade, and means connected to said outer blade for moving said outer blade in its second path successively toward said inner blade and into said slot and thence out of said slot in response to movement of said outer blade in said predetermined direction and for thereafter moving said outer blade in a direction opposite to said predetermined direction whereby, with a fruit supported on said disc so that said slot and the suture plane of the fruit are in a common plane, the pit of said fruit is clamped between said blades when said outer blade moves into said slot.

16. In an apparatus for splitting and pitting fruit, a support; a shaft journalled in said support; an inner splitting and pitting mechanism mounted on said shaft for rotation therewith in an arcuate path; powered means connected to said shaft for moving said inner mechanism in a predetermined direction along said path; an aligning crank journalled on said shaft having angularly related mounting and control portions radially projecting from said shaft; a slide rod projecting outwardly from said mounting portion; an outer splitting and pitting mechanism; means mounting said outer mechanism on said rod for slidable movement toward and away from said inner mechanism whereby said outer mechanism is mounted for cyclical movement from a rest position, thence simultaneously in said predetermined direction and toward said inner mechanism while being in alignment therewith, thence away from said inner mechanism, thence in a direction opposite to said predetermined direction, and return to said rest position; a lever journalled on said shaft having opposite first and second ends respectively adjacent to said mounting and control portions of said crank, a link pivotally interconnecting said mounting means and said first end of said lever for controlling inward and outward movement of said outer mechanism on said rod, means connected to said control portion of said crank for yieldably urging said outer mechanism into said rest position, means connected to said second end of said lever for yieldably urging said outer mechanism outwardly along said rod, and timing means driven by said powered means and engageable with both of said yieldable means for imparting said cyclical movement to said outer mechanism during movement of said inner mechanism along said path.

17. In a fruit pitter, means for bisecting a fruit to the pit including first and second fruit penetrating members having opposed cutting edges; said first member having fruit contacting portions engageable with the flesh of a bisected fruit to support the fruit, and a pit back-up member yieldably mounted in said first member for movement in a predetermined direction and arranged to receive one end of the pit in abutting engagement; said second fruit penetrating member including a pit contact member disposed in alignment with said pit back-up member for movement in said predetermined direction toward said back-up member during relative movement of said first and second fruit-penetrating members; means for effecting relative movement between said first and second members; means controlling the amount of said movement such that said pit contact member and said pit back-up member close on the pit to grip it during a first portion of said movement, said pit back-up member being movable in said first fruit penetrating member during a subsequent portion of said relative movement; and abutment means on said first fruit penetrating member in engagement with the exterior of the fruit during relative movement of said members and facing in a direction to prevent movement of the fruit in said predetermined direction; the yielding movement of said pit back-up member relative to said first member during said subsequent portion of said relative movement being effective to permit the pit to be moved in said predetermined direction relative to the fruit that is held against movement by said abutment means.

References Cited by the Examiner

UNITED STATES PATENTS

| | | | |
|---|---|---|---|
| 1,237,528 | 8/1917 | Knox | 146—28 |
| 2,585,073 | 2/1952 | Altman | 146—28 |
| 2,588,575 | 3/1952 | Rollins | 146—28 |
| 2,652,085 | 9/1953 | Ansley | 146—28 |
| 2,704,561 | 3/1955 | Thompson | 146—28 |
| 2,818,098 | 12/1957 | Perrelli | 146—238 |
| 2,868,251 | 1/1959 | Thompson | 146—28 |
| 3,010,501 | 11/1961 | Anderson | 146—238 |

J. SPENCER OVERHOLSER, *Primary Examiner.*